United States Patent

Burke

[15] 3,652,229

[45] Mar. 28, 1972

[54] APPARATUS FOR PRODUCTION OF METAL OXIDES

[72] Inventor: Zane L. Burke, 14465 Oak Street, Whittier, Calif. 90605

[22] Filed: Mar. 12, 1969

[21] Appl. No.: 806,386

[52] U.S. Cl. .................................. 23/260, 23/147, 23/285, 159/3, 159/45, 159/46, 261/122, 261/94, 75/103, 75/72, 75/5 A, 23/267
[51] Int. Cl. ...................... B01j 1/00, C01g 3/02, C22b 3/02
[58] Field of Search ............... 23/260, 147, 285, 273; 159/3, 159/45, 46; 261/122, 94–98; 75/103, 72, 0.5, .5 A

[56] References Cited

UNITED STATES PATENTS

| | | | |
|---|---|---|---|
| 682,232 | 9/1901 | Beck | 23/147 |
| 1,945,281 | 1/1934 | Leithauser | 159/45 |
| 2,318,728 | 5/1943 | Werking | 261/96 X |
| 2,902,342 | 9/1959 | Kerley, Jr. | 23/285 X |
| 3,186,833 | 6/1965 | Cech | 75/72 |
| 3,362,458 | 1/1968 | Hopper | 159/45 X |

Primary Examiner—James H. Tayman, Jr.
Attorney—Flam and Flam and Howard A. Silber

[57] ABSTRACT

Apparatus for use in a hydrometallurgical system for producing copper or zinc oxide. A closed evaporator tank partially is filled with mild ammonia hydroxide maintained between 214° and 218° F. by recirculation through a heat exchanger external to the evaporator. A pressure of between 5 and 10 p.s.i. is maintained in the evaporator. When a metal-rich ammonia carbonate solution formed by leaching copper or zinc in an oxygenated dissolver tank is injected onto the surface of the ammonia hydroxide, a rapid reaction takes place, causing precipitation of the desired oxide and evaporation of $NH_3$, $CO_2$ and water. The precipitated oxides may be removed either continuously or in batches from the evaporator. The evaporated gases are condensed and reused in the leach solution. Efficient oxygenation in the dissolver is achieved using a novel aerator comprising a hollow carbon rod.

13 Claims, 3 Drawing Figures

INVENTOR.
ZANE L. BURKE
BY
Hinderstein & Silber
ATTORNEYS

INVENTOR.
ZANE L. BURKE
BY
Hinderstein & Silber
ATTORNEYS

APPARATUS FOR PRODUCTION OF METAL OXIDES

BACKGROUND OF THE INVENTION

1. Field of the Invention

The present invention relates to an apparatus for producing copper or zinc oxide from the corresponding metal. More particularly, the invention relates to an improved hydrometallurgical system for leaching copper or zinc with an ammonia carbonate solution and for reducing the resultant metal-rich ammoniacal solution by injection into a heated base solution, thereby causing precipitation of the desired metal oxide.

2. Description of the Prior Art

In recent years, agricultural and industrial demand for cupric and mixed copper oxides has been on the rise, while the methods employed for producing these chemicals have not changed significantly in almost 50 years. At the same time, copper has become a scarce commodity. As a result, techniques which in the past have been successful commercially involve production costs so high that the techniques no longer are capable of providing such oxides at acceptable price levels.

The heavy demand for copper oxides is typified by the agricultural industry. For example, mixtures of approximately 60 percent cupric (black) and 40 percent cuprous (red) oxides, together having a copper content in the order of 85 percent, are used as fertilizers to replace copper depleted from soil, and as micronutrients in animal and poultry feeds. Estimated present agricultural usage of such mixed copper oxides is between 10,000 and 15,000 tons annually.

Industrial use of mixed oxides, typically as intermediates in the manufacture of other chemicals, leans toward application of high cupric mixtures, typically comprising 80 percent cupric oxide (CuO), 20 percent cuprous oxide ($Cu_2O$), such mixtures averaging 78 to 79 percent copper content. About 5,000 tons of this high cupric mixed oxide is consumed each year. Further, a high grade cupric oxide containing at least 98 percent CuO with as little contaninant cuprous oxide as possible, also is used extensively in industry, particularly as a pigment in frits and as an intermediate in the manufacture of fine particulate metallic copper. Annual usage of this high grade oxide is well over 500 tons.

In the past, various schemes have been suggested for producing cupric oxide or mixed copper oxides from scrap copper. For example, U.S. Pat. No. 2,536,096 to P. J. Rowe suggests a method in which cupric oxide is manufactured by passing a heated acqueous solution of ammonia saturated with cupric copper over copper bodies in the presence of available oxygen. The resultantly formed insoluble films of cupric oxide are removed by violent agitation of the copper bodies, this action also exposing fresh metallic copper for subsequent reaction with the acqueous solution. In another similar system, described in U.S. Pat. No. 2,670,273 to J. E. Munn, copper scrap is tumbled in a closed chamber so that the metal alternately is exposed to oxygen gas, then immersed in an ammoniacal solution which corrodes the metal. Periodically, a sludge containing the produced copper oxide is withdrawn from the closed container.

Such techniques, involving preparation of copper oxides directly on the scrap metal, have not found widespread commercial acceptance. More successful have been those prior art systems employing an initial copper leaching step, followed by a reduction step to recover copper oxide from the leach solution. Exemplary of such systems is one in which scrap copper is leached with a heated solution of ammonia-carbon dioxide, water and dissolved cupric copper. The dissolved cupric copper combines with metallic copper in the scrap to form cuprous copper in the leach solution. Subsequently, reduction is accomplished in an autoclave at a temperature of 400° F, with an over-pressure of hydrogen gas produced in a standard gas reform unit. Reduction is not carried to completion, because some dissolved copper must be re-cycled for subsequent leaching. A slurry of partially reduced leach solution and copper oxide powder is discharged through heat exchangers into a decanter. The powder then is centrifuged and dried to produce industrially usable copper oxides.

More extensively used are the leaching-reduction systems in which metallic copper first is dissolved in a cupric-ammonia-carbonate solution, copper oxide then being recovered by precipitation from the ammoniacal solution. The chemistry of such systems is well described in the textbook entitled *Metallurgy of Copper* by Joseph Newton and Curtis L. Wilson, published by John Wiley & Sons, Inc., New York, 1942. As described in Chapter IX, "Hydrometallurgy", of that text, two major plants using this cupric-ammonia-carbonate process have been operated in the western hemisphere, the earliest being the Kennecott Copper Corporation plant built in Alaska in 1916, and the other being the Calumet and Hecla plant in Michigan.

The Kennecott plant was used to process copper ores (malachite and azurite) containing carbonates, so that the $CO_2$ necessary for formation of ammonium carbonate was supplied by the ore rather than being supplied independently as required when processing scrap copper. The ore was leached with a solution of aqua-ammonia, the copper carbonates going into solution to produce an enriched or "pregnant" solution of copper ammonium carbonate. A steam wash was used to recover residual ammonia from the surface of the ore.

Reduction of copper oxide from the copper rich solution of copper ammonium carbonate was accomplished by pumping this pregnant solution into a large evaporator tank. Live steam then was force through the pregnant solution, causing precipitation of the desired copper oxides. Ammonia and $CO_2$ evaporated by the steam were recovered for reuse in the leaching solution.

When producing black copper oxide with about 75 percent copper content, steam consumption of the Kennecott plant typically was from 210 to 230 pounds per ton of ore leached, 55 percent of the steam being used for evaporation (i.e., for reduction of the copper oxides) and 45 percent for the steam ore wash. Extraction of copper ranged from 75 to 88 percent, depending on the size of ore particles used, the recovery being greatest for the finest ore particle sizes.

Several significant disadvantages are encountered with this Kennecott process. First is the large amount of steam required to reduce the copper oxide. Coupled with this is the fact that steam sparging tends to produce undesired copper carbonate together with the copper oxides. Since the concentration of copper carbonate increases with greater copper content in the pregnant solution, the system is limited to operation with relatively low percentages of copper in the solution. Thus, a considerably longer time is required to produce a given volume of copper oxide than would be necessary if the system were capable of reducing pregnant solutions of higher copper content. Moreover, in the Kennecott system, a considerable hard build-up of mixed copper oxides and copper carbonates develops in the bottom of the evaporator tank. Typically, as much as 25 percent of the reduced copper oxides ends up in this hard deposit, which must be chipped from the evaporator tank about every 40 hours, and which is of no commercial value.

In the Calumet and Hecla plant, the amount of steam, and hence the energy, required for the precipitation of copper oxides is reduced somewhat by using an evaporator column approximately 4 feet in diameter and 55 feet high comprising a series of stacked basins. The pregnant solution is fed into the top of the column, while live steam is introduced into the bottom. However, to prevent the formation of copper carbonate together with the copper oxide, the plant is limited to the use of pregnant liquor comprising 4 to 5 percent copper, such pregnant ammonia-carbonate solutions typically containing 50 to 60 grams per liter of copper. Moreover, as with the Kennecott system, about 30 percent of the precipitated copper oxides deposit as scale on the walls and lower surface of the evaporator column, significantly decreasing the yield of Calumet and Hecla system, and preventing the system from being used in a continuous production mode.

No significant improvements in the technique of recovering copper oxides have been made since the Calumet and Hecla plant. Thus, while U.S. Pat. No. 3,186,833 to R. E. Cech sets forth a novel system for reducing copper oxide, the patent shows copper oxide being produced from copper scrap by a technique closely related to the Kennecott and Calumet-Hecla systems. That is, Cech illustrates the use of live steam introduced through an infuser in the bottom of a distillation tower filled with pregnant copper-ammonia-carbonate solution to produce copper oxides.

To summarize, all of the prior art leaching-reduction systems for producing copper oxides from copper are characterized as utilizing a pregnant copper ammonia carbonate solution having a relatively low copper percentage of from 5 to 7 percent. An evaporation tower or counter-current evaporator is filled with this liquor, and live steam is fed directly through the pregnant solution, from the bottom of the tower, to cause precipitation of the copper oxide.

While such prior art systems produce commercially acceptable copper oxides, they use considerable energy for its production, are severely limited as to the copper content of the pregnant solution used, and exhibit development of a hard scale on the inside of the distillation towers which periodically must be scraped from the chamber. The combination of these shortcomings leads to significant increase in the cost of the produced oxide over that which theoretically should be achievable. Of course, it will be appreciated that even a small percentage reduction in the production cost per pound of copper oxide would have significant commercial impact.

The present invention overcomes all of these shortcomings of the prior art, providing a novel system for the production of copper and other metal oxides, which system does not involve steam sparging of the pregnant solution. Thus, copper-ammonia-carbonate liquors having considerably higher copper content than usable in prior art systems may be employed, leading to significant reductions in time, energy, and plant size required to produce a given volume of oxide. Moreover, the resultant oxides are remarkably free of carbonate impurities. Further, the inventive system results in virtually no scale development within the reduction chamber, hence is capable of continuous, as well as batch, production. All of these factors result in considerably lower oxide production costs than realizable by any prior art technique.

SUMMARY OF THE INVENTION

In accordance with the present invention, there is provided a novel hydrometallurgical system for producing oxides of metals such as copper and zinc. The system employs a novel method of reducing a copper rich ammonia carbonate solution to produce cupric oxide or mixed copper oxides, or of reducing a zinc rich ammonia carbonate solution to produce zinc oxides.

To effectuate reduction of the metal-ammonia-carbonate solution, an evaporator is used which comprises a large closed chamber, the lower end of which may be conically shaped to facilitate removal of the precipitated oxides. The lower region of the evaporator is filled with a base solution, typically ammonia in water. The temperature of this base solution is maintained within a preferred operating range of from 214° to 218° F. by recirculation through a heat exchanger external to the evaporator. This heating also develops a gas pressure in the evaporator which preferably is maintained between 5 and 10 p.s.i. by means of a throttle valve associated with a vent from the evaporator.

A feed injector is situated in the evaporator above the fluid level of the heated base solution. The copper or zinc-rich pregnant solution (liquor) is supplied through this feed injector so as to drop onto the heated base solution. When the liquor strikes the heated base solution, a rapid reaction takes place in which copper oxide is precipitated, while the ammonia, carbonate and water components of the solution are evaporated. The oxide precipitates settle to the bottom of the evaporator tank and may be removed therefrom periodically or continuously.

This novel reduction technique permits the use of pregnant solutions having significantly higher metal content than possible with prior art systems. For example, copper-ammonia-carbonate liquors having a copper content of from about 120 to 150 grams per liter, or about 11 to 15 percent copper, may be employed. Thus, significantly less time, energy and plant size is required to produce a given amount of oxide, as compared with prior art techniques.

Virtually no scaling occurs within the evaporator, substantially reducing what in prior art systems was a serious source of product loss. Thus, while the inventive system may be used for processing a batch of pregnant solution, allowing the precipitated copper oxide to accumulate in the bottom of the evaporator before periodic removal, the fact that no scale is formed permits the system to be run on a continuous basis, if so desired.

The gaseous $NH_3$, $CO_2$ and water, produced when the pregnant solution strikes the base solution in the evaporator, are vented into an appropriate condenser, wherein they are condensed to a liquid state. This condensed liquid then is cooled and accumulated for reuse as barren leaching solution in the system.

In a system utilizing the inventive oxide reduction technique, a barren leach solution of ammonia carbonate having some cupric ions is provided to a dissolver tank containing pieces of the supply material. Typically, the dissolver may contain scrap copper or zinc, supported on a perforated plate mounted within the dissolver tank. The barren solution is recirculated through the dissolver tank while oxygen is introduced into the tank using a novel device.

Specifically, situated below the perforated plate, and immersed within the leaching solution, is a carbon rod having a hollow interior into which is forced compressed air. The carbon is sufficiently porous so that oxygen and nitrogen in the air will flow through the carbon rod, each breaking up into thousands of tiny bubbles. The large surface area provided by these tiny bubbles permits very efficient oxygen absorption into the leaching solution. The carbon also appears to play a catalytic role in the reaction of oxygen with the ammoniacal solution. Thus, the novel carbon rod aerator is a much more efficient oxygenator than the perforated air hoses or venturi nozzles used in the prior art to introduce oxygen into leaching tanks.

When the ammoniacal solution has reached the cupric/cuprous ion content appropriate to produce the desired mixed copper oxide, the solution is removed from the dissolver and stored in a tank for subsequent supply to the evaporator. To produce cupric oxide, this cupric/cuprous solution is fed into a finish aeration tank containing no source metal. The solution is further oxygenated with another carbon rod aerator identical to that used in the dissolver. Aeration is continued until all the cuprous ions in the solution have been converted to cupric. The resultant cupric pregnant solution then is stored prior to introduction into the evaporator.

Thus, it is an object of the present invention to provide a unique system for producing metal oxides.

Another object of the present invention is to provide a unique system for producing cupric oxide or mixed copper oxides from metallic copper.

It is another object of the present invention to provide a novel hydrometallurgical system for leaching copper or zinc and for reducing copper or zinc oxides from the resultant metal-rich leach solution.

Yet another object of the present invention is to provide a novel technique and apparatus for reducing metal-rich ammoniacal solutions.

It is yet another object of the present invention to provide a novel reduction apparatus comprising a closed container wherein a base solution is maintained at a substantially constant temperature, and wherein a metal-rich ammoniacal solution is dropped onto the surface of the base solution, this resultant reaction causing precipitation from the solution of metal oxide.

A further object of the present invention is to provide an improved apparatus for recovering copper oxides from a copper-rich ammoniacal solution, comprising a tank containing a base solution maintained at substantially constant temperature by recirculation through a heat exchanger, and a feed injector situated above the level of the base solution through which the copper-rich ammoniacal solution may be injected onto the base solution for reaction therewith.

It is a further object of the present invention to provide a novel dissolver for reacting barren ammonia carbonate solution with a metal and oxygen to produce a metal-rich ammoniacal solution.

Yet a further object of the present invention is to provide improved means for introducing oxygen into a solution, comprising a hollow carbon element, oxygen under pressure being introduced into the interior of the carbon element and escaping through the porous carbon in the form of thousands of small bubbles.

A still further object of the present invention is to provide a novel system for converting metallic copper or zinc to copper oxide or zinc oxide respectively.

BRIEF DESCRIPTION OF THE DRAWINGS

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

FIG. 1 is a somewhat diagrammatic flow sheet for the inventive system for preparing oxides of copper and the like.

DESCRIPTION OF THE PREFERRED EMBODIMENT

Figure 1:
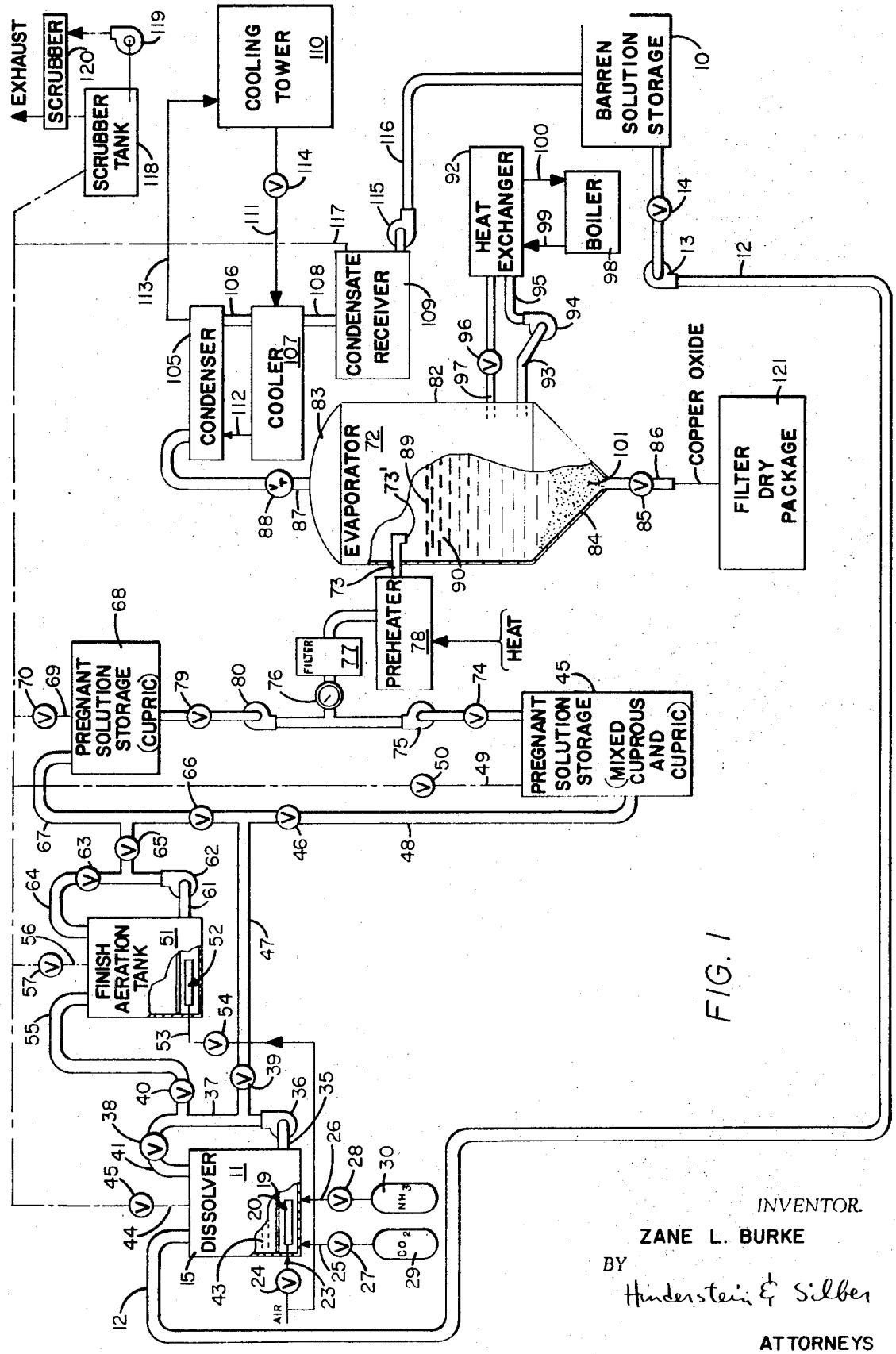

Referring now to the drawings, and particularly to FIG. 1 thereof, there is shown a diagrammatic flow sheet for the inventive system for producing oxides of copper or the like. The system will be described herein in terms of its application in the production of cupric oxide or mixed copper oxides, this being illustrative of the system use. System application to the production of other oxides, such as zinc oxide, then will be discussed.

The inventive system employs a leaching solution which in its barren state comprises ammoniacal ammonia carbonate containing a slight amount of copper as cupric ions. Thus, the barren solution is known chemically as cupric ammonium carbonate. As shown in FIG. 1, the barren solution is stored in an appropriate tank 10 from which the solution may be supplied to a dissolver tank 11 via a pipe 12 by means of a conventional circulating pump 13, when a valve 14 is open. Within dissolver 11 the barren solution is reacted with metallic copper and oxygen to provide an ammonia carbonate solution containing both cuprous and cupric ions. If desired, mixed copper oxides then may be reduced directly from this copper rich, "-pregnant" cuprous/cupric solution, or the solution may be further aerated, as described hereinbelow, for subsequent production of cupric oxide.

Figure 2:
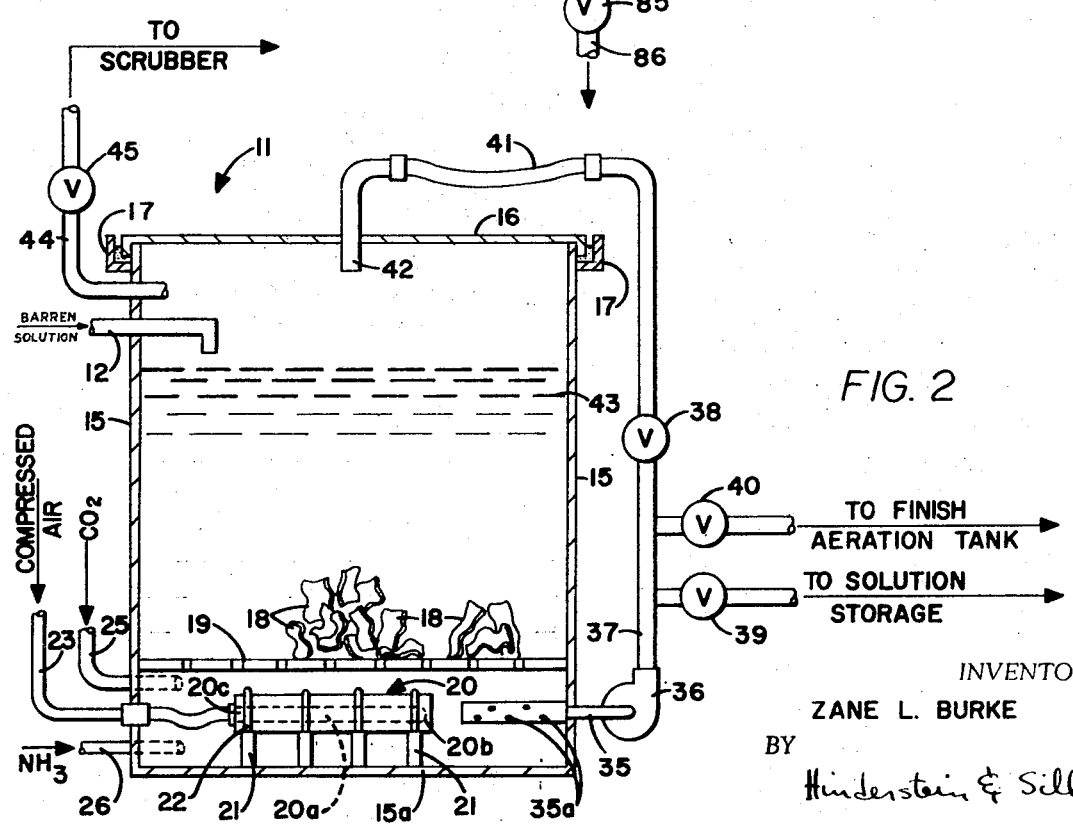
FIG. 2 is a sectional view of a dissolver tank useful in conjunction with the present invention and employing a novel carbon rod aerator, interconnections to the dissolver tank being shown somewhat diagrammatically.

As illustrated in FIG. 2, dissolver 11 typically comprises a cylindrical steel tank 15 having a closed bottom 15a and provided with a lid 16 sealed about its periphery by a conventional water seal 17. In a commercial embodiment, dissolver 11 may be on the order of 8 feet in diameter and 15 feet high.

The metallic copper source, typically pieces 18 of copper scrap or other copper bearing material, is loaded within dissolver 11. The copper 18 rests atop a perforated plate 19 extending completely across the interior of tank 15 in spaced parallel relationship with tank bottom 15a.

Situated within tank 15 below perforated plate 19 is an elongate carbon rod 20 herein used as an aerator. Typically, carbon rod 20 may have an outside diameter of from 4 to 5 inches, and an overall length on the order of 5 feet. Carbon rod 20 is supported above tank bottom 15a on a plurality of spacers 21, being attached thereto by appropriate straps 22. Carbon rod 20 contains a hollow elongate interior channel 20a, typically having a diameter on the order of 2 inches, and terminating at a closed end 20b. The other end 20c of the hollow interior of carbon rod 20 is appropriately coupled to a pipe 23 which leads via a valve 24 (FIG. 1) to a source of compressed air (not shown).

Dissolver 11 also is provided with appropriate inlet pipes 25 and 26 connected respectively via valves 27 and 28 to sources 29 and 30, respectively, of $CO_2$ and $NH_3$. As will be described hereinbelow, $CO_2$ and $NH_3$ are not supplied continuously, sources 29 and 30 only being used when necessary to replenish in the barren solution ammonia and carbonate lost as a result of evaporation, etc. during system operation.

Still referring to FIGS. 1 and 2, dissolver 11 is provided with an appropriate outlet pipe 35, having openings 35a situated within tank 15 below perforation plate 19. Outlet pipe 35 communicates, via a circulating and transfer pump 36, with another pipe 37 connected to valves 38, 39 and 40. By opening valve 38 and closing valves 39 and 40, solution from the bottom of dissolver 11 may be pumped via pipe 37 and a flexible hose section 41 to an inlet 42 extending back into the interior of tank 15 through lid 16. In this manner, the ammoniacal solution 43 in dissolver 11 may be recirculated over the copper bearing material 18 to assure substantially uniform chemical composition of the solution. Dissolver 11 is appropriately vented via a pipe 44 and a valve 45.

The operation of dissolver 11 may be understood in conjunction with FIGS. 1 and 2. Initially, an appropriate volume of copper source material 18 is placed atop perforated plate 19 and dissolver 11 filled with cupric ammonium carbonate solution 43 from barren solution storage 10. The barren solution is assayed, and if necessary additional $CO_2$ and $NH_3$ are added to bring the solution up to appropriate concentration levels. Typically, the $NH_3$ concentration may be 160 g./l., $CO_2$ content may be 100 g./l. and copper (as cupric ions) may be 6.0 g./l. Of course, these values are illustrative only, and, as well known to those skilled in the art, a wide range of leaching solution concentration values may be employed. When the desired barren solution assay has been achieved, the solution is recirculated through dissolver 11 using circulation pump 36.

As ammoniacal solution 43 is recirculating, compressed air is introduced into dissolver 11 via open valve 24, pipe 23 and carbon rod aerator 20. The air supplied is under sufficient pressure so as to be forced through the porous walls of carbon rod 20, the pores breaking the air into many thousands of minute bubbles, thus greatly increasing the surface area of the oxygen exposed to the solution 43, and concomitantly increasing the ability of the oxygen to unite with the solution. Moreover, carbon appears to act as a catalyst for the combination reaction of the oxygen with the ammoniacal solution.

Utilization of the inventive carbon rod aerator requires far less air to be supplied to dissolver 11 than was necessary using prior art techniques wherein air was blown into a dissolver through an open pipe or a venturi nozzle. Excess air injected into dissolver 11 is carried off via vent line 44, carrying with some $CO_2$ and $NH_3$ gases stripped from solution 43. Thus, it is obvious that by using the inventive carbon rod aerator, less air is needed and hence less $CO_2$ and $NH_3$ gases are stripped from the ammoniacal solution as compared with prior art methods.

The recirculating ammoniacal solution 43 reacts with the copper 18 and absorbs oxygen supplied via aerator 20 to form a copper rich solution containing a mixture of cupric and cuprous ions. Typically, the pregnant solution may contain from 120 to 150 g./l. of copper. While solution 43 may be represented by the formula $CuO(NH_4)_2CO_3H_2O$, the actual composition of the pregnant solution may depart somewhat from that ideal formulation.

The ratio of cupric to cuprous ions in the pregnant solution will depend on the amount of oxygen allowed to enter solution 43 in dissolver 11. More aeration will provide a high cupric, low cuprous ion concentration, while less aeration will provide a higher cuprous and lower cupric ion content. For a particular application, the amount of air introduced into dissolver 11 will be controlled somewhat empirically to provide a pregnant solution having a cuprous to cupric ion ratio appropriate to produce a mixed oxide of desired formulation.

Periodically, the assay of the ammoniacal solution in dissolver 11 is checked. When the desired concentration of cupric and cuprous ions has been achieved, recirculation of the solution is stopped, and the now copper rich solution is removed from dissolver 11. If mixed oxides are to be prepared, the cuprous/cupric solution from dissolver 11 may be stored directly in a pregnant solution storage tank 45 (FIG. 1). Transfer of the mixed cuprous and cupric pregnant solution from dissolver 11 is achieved by closing valves 38 and 40 and opening valves 39 and 46. Pump 36 then is used to transfer pregnant solution 43 to storage tank 45 via pipes 47 and 48. Tank 45 itself is appropriately vented through a pipe 49 and a valve 50.

To produce cupric oxide, it is necessary to convert substantially all of the cuprous ions in the ammoniacal solution 43 provided by dissolver 11 into cupric ions. To accomplish this, additional aeration of the cuprous-cupric ammoniacal solution from dissolver 11 is accomplished in a finish aeration tank 51 shown in FIG. 1. Aeration tank 51 is identical in construction to dissolver 11 (FIG. 2) and utilizes a carbon rod aerator 52 corresponding in construction and operation to carbon rod aerator 20 in dissolver 11. Compressed air is supplied to aerator 52 via a pipe 53 and a valve 54 from a source not shown in the figures.

No copper is placed within finish aeration tank 51. Pregnant solution 43 (containing both cuprous and cupric ions) from dissolver 11 is transported to finish aeration tank 51 via pump 36, valve 40 and an inlet pipe 55. Of course, during this transfer operation, valves 38 and 39 both are closed. Aeration tank 51 is provided with an appropriate vent line 56 and valve 57. Recirculation of the solution being aerated in tank 51 is accomplished via an outlet pipe 61, a circulation pump 62, a valve 63 and an inlet pipe 64, an outlet valve 65 being closed during such recirculation.

When the solution in finish aeration tank 51 has been aerated sufficiently so as to convert substantially all of the cuprous ions to cupric, valves 63 and 66 are closed, valve 65 is opened, and the resultant cupric pregnant solution is transferred via pump 62 and a pipe 67 into a pregnant solution storage tank 68. Storage tank 68 itself is vented via a pipe 69 and a valve 70. It will be appreciated that storage tank 68 is identical to storage tank 45. Thus, while FIG. 1 indicates that tank 68 is used to store the pregnant solution from which cupric oxide is produced, and that tank 45 is used to store the pregnant solution from which mixed copper oxide is produced, the function of the two tanks may be interchanged. Similarly, both of tanks 45 and 68 may be used to store the same kind of pregnant solution.

Figure 3:
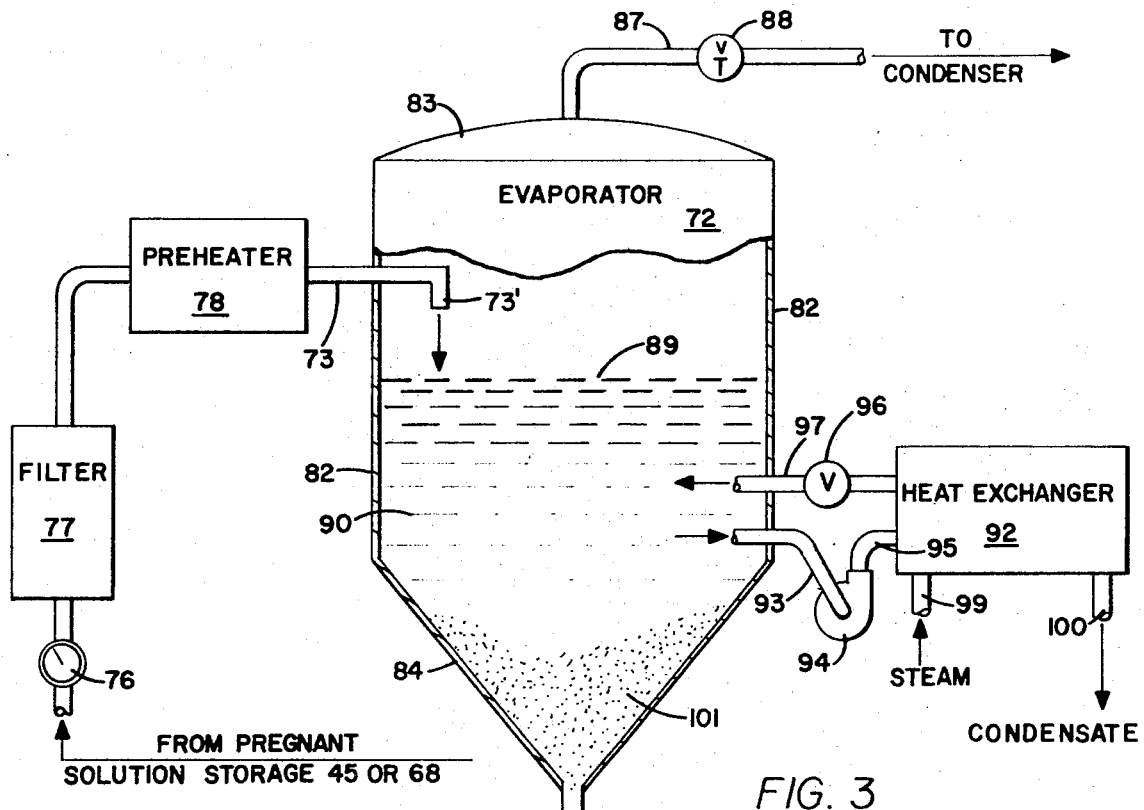
FIG. 3 is a side elevation view, partly cut away and in section, of the novel reduction apparatus used in conjunction with the system of FIG. 1, appropriate interconnections being shown somewhat diagrammatically.

In accordance with the present invention, preparation of copper oxides from pregnant ammoniacal solution is accomplished in a completely novel manner in an evaporator 72 (FIGS. 1 and 3). If mixed copper oxides are to be produced, the pregnant liquor containing cuprous and cupric ions, and stored in solution storage tank 45, is transported to an inlet pipe 73 associated with evaporator 72 via a valve 74, a circulation pump 75, a flow rate meter 76, a filter 77 and a preheater 78. Similarly, when cupric oxide is to be produced, pregnant liquor containing only cupric ions, and stored in solution storage tank 68, is transported to evaporator inlet pipe 73 via a valve 79, a circulation pump 80, flow meter 76, filter 77 and preheater 78.

Filter 77 is conventional, and is used to filter out any solid impurities which may be present in the pregnant solution. Use of preheater 78 is optional, as the pregnant solution may be injected into evaporator 72 at ambient temperature. However, the pregnant solution may be heated prior to injection into the evaporator, so as to minimize the amount of cooling of the base solution maintained in evaporator 72 when the pregnant solution is injected. For optimum operation, preheater 78 should not raise the temperature of the pregnant solution to above about 130° F.

The configuration of evaporator 72 is shown in FIGS. 1 and 3. Referring thereto, evaporator 72 comprises a tank having a substantially cylindrical sidewall 82, a dome-shaped top 83, and a conically shaped bottom 84. Preferably, evaporator 72 is constructed of a material such as steel capable of withstanding an internal pressure of at least 15 pounds per square inch, and a temperature of at least 220° F. It has been found advantageous to construct evaporator 72 so that its overall height is about one-third greater than its diameter. Thus, in a typical embodiment, evaporator 72 may have a diameter on the order of 9 feet, and an overall height on the order of 13 feet.

Conical bottom 84 preferably has an angle of about 40° with respect to the vertical axis through evaporator 72, this angle not being critical, but being helpful to facilitate the discharge of oxides from evaporator 72 via a valve 85 and an outlet pipe 86. Evaporator 72 is provided at its upper end with a vent pipe 87 cooperating with a throttle valve 88, the latter being useful to adjust and control the head pressure in the evaporator. Pregnant solution inlet pipe 73 is connected to a feed nozzle 73' situated within the cylindrical portion 82 of evaporator 72, at a height which is above the fluid level 89 of a base solution 90 maintained within the lower portion of evaporator 72. Feed nozzle 73' points downward so as to spray or drop the incoming pregnant solution onto the surface of base solution 89.

Initially, base solution 90 may comprise weak ammonia hydroxide, typically containing 10 to 15 grams per liter of $NH_3$. The temperature of base solution 90 is maintained substantially constant within a range of from 212° to 225° F., and preferably within a range of between 214° and 218° F. by means of a heat exchanger 92 associated with evaporator 72.

Heat exchanger 92 (FIGS. 1 and 3) is of conventional design, comprising, e.g., two pass tubes and a shell. Base solution 90 is recirculated through heat exchanger 92 via an output pipe 93, a circulation pump 94, a pipe 95 leading into heat exchanger 92, a valve 96, and a return pipe 97 leading back from heat exchanger 92 into evaporator 72. Both of pipes 93 and 97 terminate within evaporator 72 below the level 89 of base solution 90. Heat exchanger 92 itself is provided with steam from a conventional boiler 93, the steam being provided via a pipe 99, with condensate being returned to boiler 98 via a pipe 100.

To avoid flashing within heat exchanger 92 it is desirable to maintain a back pressure of at least 50 p.s.i. within pipe 95. This readily may be achieved using a circulation pump 94 designed to pump 150 gallons per minute at a total discharge head of 100 feet.

To prepare for the reduction of copper oxides from pregnant ammoniacal solution, evaporator 72 is filled approximately one-third full with base solution 90. As noted, at the beginning of system operation, this base solution may comprise weak ammonia hydroxide having approximately 10 to 15 g./l. of $NH_3$. Valve 96 is opened and pump 94 is used to circulate base solution 90 through heat exchanger 92. Throttle valve 88 is closed, and steam is applied to heat exchanger 92 along inlet pipe 99. Recirculation of base solution 90 continues until the solution has reached a temperature in the range of from 212° to 225° F. and preferably between 214° and 218° F. Some of the base solution will evaporate, developing a head pressure within evaporator 72. If necessary, throttle valve 88 may be adjusted to maintain the pressure at a level of at least 5 p.s.i., and preferably between 5 and 10 p.s.i.

When the base solution 90 has reached the operating temperature, throttle valve 88 is opened and at the same time, pregnant ammoniacal solution from storage tank 45 or 68 is supplied via inlet line 73 to evaporator feed nozzle 73'. A flow rate on the order of 8 to 10 gallons per minute, as measured by flow rate meter 76, has been found to give excellent results in the present system, when using an evaporator 72 of the typical dimensions mentioned hereinbefore. Of course, the optimum flow rate will vary somewhat depending in part on the size of the evaporator used.

As the pregnant solution hits the surface 89 of base solution 90, rapid chemical reduction takes place, with copper oxide being precipitated out as a solid, and with $CO_2NH_3H_2O$ gas being produced as by-product within evaporator 72. Of course, if cuprous/cupric pregnant solution is used, mixed cuprous oxide and cupric oxide will be produced; if cupric pregnant solution is used, pure cupric oxide will be produced. In either case, the copper oxide produced settles through the base solution 90, coming to rest within the conical bottom region 84 of evaporator 72. The accumulation of such copper oxide is indicated by the numeral 101 in FIGS. 1 and 3.

The reduction of pregnant ammoniacal solution to produce copper oxide is an endothermic reaction. Thus, the temperature of base solution 90 will tend to drop at the beginning of the cycle. To compensate for this, additional steam is provided to heat exchanger 92 from boiler 98, so as to maintain the temperature of base solution 90 within the desired operational range. Once the necessary amount of steam required to maintain the temperature of base solution 90 (for a given flow rate of pregnant solution) has been determined, no further adjustment of the amount of steam provided to heat exchanger 92 need be undertaken. In like manner, it is desirable to maintain the pressure within evaporator 72 at at least 5 p.s.i. during the reduction operation; this may be achieved by appropriate adjustment of throttle valve 88.

Although not required, control of the amount of steam provided to heat exchanger 92, and/or the rate at which the base solution 90 is recirculated through the heat exchanger, may be automatically controlled, in a manner well known to those skilled in the art, in response to the measured temperature of the base solution within evaporator 72. Similarly, the operation of throttle valve 88 may be automatic in response to the measured pressure within evaporator 72.

As copper oxide is produced, the constituency of base solution 90 will tend to change, some copper, ammonia and $CO_2$ being absorbed from the injected pregnant solution. However, base solution 90 tends to stabilize rapidly, for example at a typical assay of 0.27 pounds per gallon of $NH_3$; 0.78 ounces per gallon of $CO_2$; and 0.07 pounds per gallon of CuO. The actual assay of solution 90 is not critical so long as it remains basic.

As copper oxide 101 is being produced within evaporator 72, gaseous ammonia, carbon dioxide and water vapor accumulate within evaporator 72. These gases are transported from evaporator 72 along vent line 87, throttle valve 88 being adjusted to maintain the desired minimum pressure of 5 pounds per square inch within evaporator 72. The exhaust gases are liquified in a conventional condenser 105, the liquid discharge of which, along an outlet pipe 106, preferably is at a temperature of between 130° and 140° F. This condensed liquid temperature is sufficiently high so that carbonate crystals will not form within condenser 105.

The condensed liquid is fed via pipe 106 to a cooler 107 wherein it is reduced in temperature to below 120° F. and then delivered via a pipe 108 to an absorber or condensate receiver 109. This liquid temperature of less than 120° F. is sufficiently low as to minimize evaporative ammonia loss in condensate receiver 109.

Chilled water or other refrigerant from a conventional cooling tower 110 is provided to cooler 107 along a pipe 111. From cooler 107 the chilled water is supplied to condenser 105 via a pipe 112, the water being returned to cooling tower 110 via a pipe 113. A control valve 114 permits adjustment of the cooling water flow rate to achieve the desired temperatures of the condensed $CO_2NH_3H_2O$.

The recovered liquid ammonia carbonate from condensate receiver 109 may be reused as barren solution. That is, the leaching solution used in the system is recovered and may be pumped from condensate receiver 109 into barren solution storage 10 by means of a pump 115 and a pipe 116.

Condensate receiver 109 itself is vented via a line 117, to a conventional scrubber tank 118, which tank also receives as inputs the vent lines 44, 56, 49 and 69 from dissolver 11, aeration tank 51 and storage tanks 45 and 68, respectively. The contents of a scrubber tank 118 is pumped, via a pump 119 to a conventional scrubber 120, the scrubbed gases being appropriately exhausted.

To terminate operation of evaporator 72 after processing of a predetermined amount of pregnant solution consistent with the capacity of the evaporator, the feed is stopped, and recirculation of base solution 90 through heat exchanger 92 is continued for a period of approximately 1 to 1½ hours. In this period, substantially all of the absorbed ammonia, carbonate and copper will be evaporated from base solution 90, and the solution again will appear relatively clear. Steam then is shut off to heat exchanger 92, but circulation of base solution 90 is continued for a short period of time to allow the solution temperature to drop gradually below 212° F.

Valve 85 next is opened and the deposited copper oxide 101 removed from evaporator 72 via pipe 86. Base solution 90, now just a clear solution of water with a slight amount of $NH_3$, also will be drained at this time. As indicated schematically by block 121 in FIG. 1, the oxide is separated from solution 90 by filtering, the solution being reusable in evaporator 72. The recovered copper oxide then is dried and packaged conventionally.

Oxides produced in accordance with the present invention have been found to be of extremely high purity, very fine in particle size, and of high density. For example, when producing cupric oxide (using a pregnant ammoniacal solution containing only cupric ions), assay of the resultant CuO disclosed the following typical characteristics:

Copper content — 79 percent
Density — 165 pounds per cubic foot
Mesh — 100 percent - 35 micron
CuO — 99.5 percent
$Cu_2O$ — 0.5 percent When producing mixed oxides, using a pregnant solution containing both cuprous and cupric ions, copper oxides of similarly fine size are produced. The density of the resultant mixed oxides depend on the actual cuprous/cupric ratio, with higher concentrations of cuprous oxide having higher copper content and hence higher density.

Note that when using the inventive system in a batch processing mode, a typical production run of about 24 hours is sufficient to produce about 10,000 pounds of oxides, using an evaporator 9 feet in diameter and 13 feet high, and employing a pregnant solution containing about 150 g./l. of copper ions, introduced into the evaporator at a rate of about 8 to 9 gallons per minute.

During preparation of copper oxide as described hereinabove in accordance with the present invention, no hard scale develops on the inside of evaporator 72. Thus, there is no requirement that evaporator 72 periodically be shut down for scale removal, as was necessary with prior art reduction equipment. As a result, evaporator 72 may be run continuously, with precipitated copper oxide continually being withdrawn via valve 85 and pipe 86, while pregnant solution is fed simultaneously and continuously to evaporator 72 via feed line 73.

The pregnant solution used for continuous production of copper oxides is identical to that used for batch operation. However, it is preferable that base solution 90 have a somewhat different initial assay. Thus, for continuous operation, a base solution 90 containing between 0.05 and 0.07 pounds of $NH_3$ per gallon of solution has been found satisfactory. Further, it is desirable to use a slower pregnant solution feed rate than in batch operation. Thus, a feed rate of about 6 to 7 gallons per minute has been found appropriate when using an evaporator 72 having the dimensions described above.

The exact pregnant solution feed rate used during continuous operation should be adjusted such that the amount of material going off as ammonia and $CO_2$ vapors or precipitating out as oxide will be exactly balanced by the amount of pregnant solution injected. The correct feed rate may be determined empirically by observing the assay of base solution 90 during system operation. If the $NH_3$ concentration in the base solution tends to increase with time, the feed rate is too great; if the $NH_3$ concentration decreases with time, the feed rate is too slow.

To initiate a continuous run, valve 85 is closed while sufficient pregnant solution is reduced by evaporator 72 to build up a substantial accumulation 101 of precipitated oxide within the conical-shaped bottom region 84 of evaporator 72. Once such an accumulation has been obtained, valve 85 is opened and a copper oxide removed as a heavy slurry through tube 86. Preferably, the removal rate corresponding to the rate at which additional copper oxide is precipitating out on top of the accumulation 101. In this manner, the accumulated oxide 101 within evaporator 72 acts as a buffer between base solution 90 and the outlet. The slurry withdrawn from evaporator 72 may be pumped through a filter to separate the oxide, thereby effectuating continuous production.

The inventive system described hereinabove in conjunction with FIGS. 1, 2 and 3, also may be used to produce zinc oxide. To accomplish such zinc oxide production, an identical procedure is used except that metallic zinc rather than copper is used within dissolver 11. Although the same barren solution is used, the zinc concentration in the pregnant solution will be less than for copper, since such ammoniacal solutions saturate at lower concentrations of zinc as compared with copper. For this reason, the system yield of oxide per gallon of pregnant solution will be lower for zinc than for copper.

Whether producing copper or zinc oxides, the initial characteristics of base solution 90 are not critical. Thus, the system could operate with an $NH_3$ concentration as high as 0.25 pounds per gallon. Of course, such a high ammonia concentration is undesirable, since in the preferred operating temperature range of from 214° to 218° F. considerable ammonia would be evaporated. On the other hand, it is desirable that the ammonia content not drop below about 0.05 pounds per gallon, since below that level the pregnant solution tends to flash to carbonate, rather than to precipitate pure oxide, when dropped into the heated base solution.

While the invention has been described with respect to a preferred physical embodiment constructed in accordance therewith, it will be apparent to those skilled in the art that various modifications and improvements may be made without departing from the scope and spirit of the invention.

I claim:

1. An apparatus for reducing metal oxide from a metal-rich ammoniacal solution, said apparatus comprising:
    a dissolver tank containing copper or zinc source material and an ammonia carbonate solution initially containing few metal ions,
    means for recirculating said ammonia carbonate solution through said dissolver tank,
    an aerator for introducing and substantially uniformly distributing air or oxygen into said ammonia carbonate solution within said dissolver tank, whereby said copper or zinc and oxygen combine with said ammonia carbonate to form a cuprous/cupric or zinc metal-rich ammoniacal solution,
    an evaporator tank,
    a boiling basic solution contained within said tank,
    a heat exchanger external to said evaporator tank and connected thereto by output and return pipes both terminating below the liquid level of said basic solution,
    a pump for recirculating said basic solution through said heat exchanger to maintain said basic solution at boiling temperature,
    injection means for continuously supplying said metal-rich ammoniacal solution to said basic solution, the resultant reaction causing precipitation of said metal oxide,
    means for transferring said metal-rich ammoniacal solution from said dissolver tank to said injection means, and
    means for condensing and recovering the gaseous ammonia, $CO_2$ and water vapor evaporated when said metal-rich ammoniacal solution reacts in said basic solution.

2. An apparatus according to claim 1 wherein said evaporator tank comprises a closed vessel having controlled outlet means adjustable to maintain pressure.

3. An apparatus according to claim 2 wherein said controlled outlet means comprises a throttle valve.

4. An apparatus according to claim 1 wherein said injection means comprises a supply pipe extending through the wall of said evaporator tank and terminating in a nozzle permitting said metal-rich ammoniacal solution entering said tank through said pipe to drop from said nozzle onto the surface of said basic solution.

5. An apparatus according to claim 1 further comprising means for removing said precipitated metal oxide from said evaporator tank.

6. An apparatus according to claim 1 wherein said means for condensing and recovering comprises:
    a condenser communicating with said controlled outlet means, recovered liquid from said condenser having a temperature above about 130° F., and
    cooler means for reducing the temperature of said recovered liquid to below about 120° F.

7. An apparatus according to claim 1 further comprising means for controlling the feed rate of said metal-rich ammoniacal solution through said supply pipe and said nozzle.

8. An apparatus for reducing a copper or zinc-rich ammonia carbonate pregnant solution to the corresponding copper or zinc oxide, said apparatus comprising:
    a dissolver tank containing copper or zinc source material and an ammonia carbonate solution initially containing few metal ions,
    means for recirculating said ammonia carbonate solution through said dissolver tank,
    an aerator for introducing and substantially uniformly distributing air or oxygen into said ammonia carbonate solution within said dissolver tank, whereby said copper or zinc and oxygen combine with said ammonia carbonate to form a cuprous/cupric or zinc pregnant solution,
    a closed evaporator tank having a generally conical bottom and a height at least one-third greater than its diameter, said tank being capable of withstanding an internal pressure of at least 15 p.s.i., said tank having a first outlet pipe adjacent the apex of said conical bottom for removal therethrough of said oxide, said tank having a second outlet pipe for removal therethrough of gases evaporated in said tank, said tank further having an inlet pipe for continuous injection of said pregnant solution into said tank,
    a portion of said tank being filled with a basic solution,
    means for transferring said pregnant solution to said evaporator tank inlet pipe,
    a heat exchanger external to said tank,
    pump means for forced recirculation of said basic solution through said heat exchanger and back to said tank below the liquid level therein, thereby maintaining the temperature of said basic solution between 214° and 218° F.,
    throttle valve means controlling the flow of said evaporated gases through said second outlet pipe for maintaining a pressure within said tank of between 5 and 10 p.s.i., and
    a condenser communicating with said tank via said second outlet pipe, said condenser liquifying the ammonia, $CO_2$ and water evaporated within said tank when said pregnant solution enters said basic solution,
    whereby pregnant solution injected through said inlet pipe will enter said heated basic solution, said oxide being formed in the resultant reaction.

9. An apparatus as defined in claim 8 wherein said aerator comprises:

a hollow carbon element, and means for introducing air or oxygen under pressure into the hollow interior of said carbon element, said air or oxygen escaping through pores in said carbon in the form of multiple small bubbles.

10. An apparatus as defined in claim 9 wherein said carbon element is rod-shaped.

11. An apparatus as defined in claim 8 further comprising:

an aeration tank, means for transferring said cuprous/cupric pregnant solution from said dissolver tank into said aeration tank, means for introducing sufficient oxygen into said cuprous/cupric pregnant solution in said aeration tank to convert the cuprous ions in said pregnant solution to cupric ions, and means for transferring the resultant cupric pregnant solution to said evaporator tank inlet pipe.

12. An apparatus as defined in claim 11 wherein said means for introducing comprises:

a hollow carbon element, and means for introducing air or oxygen under pressure into the hollow interior of said carbon element, said air or oxygen escaping through pores in said carbon in the form of multiple small bubbles.

13. A system for reducing metal oxide from a metal-rich ammoniacal liquor, said system comprising:

a dissolver tank containing copper or zinc source material and an ammonia carbonate solution initially containing few metal ions, means for recirculating said ammonia carbonate solution through said dissolver tank, an aerator for introducing and substantially uniformly distributing air or oxygen into said ammonia carbonate solution within said dissolver tank, whereby said copper or zinc and oxygen combine with said ammonia carbonate to form a cuprous/cupric or zinc metal-rich ammoniacal liquor, a tank, a boiling ammonia hydroxide solution contained within said tank, a heat exchanger external to said evaporator tank and connected thereto by output and return pipes both terminating below the liquid level of said solution, pump means for forced recirculation of said solution through said heat exchanger to maintain said solution at a boiling temperature in the range of 212° to 225° F., controlled outlet means for maintaining the pressure within said evaporator tank at above about 5 p.s.i., injection means for continuously supplying said metal-rich ammoniacal liquor to said solution, the resultant reaction causing precipitation of said metal oxide, ammonia from said liquor replacing any evaporating from said solution so as to maintain the assay of said solution substantially constant during oxide reduction, an aeration tank, valved conduit means for transferring said metal-rich ammoniacal liquor from said dissolver tank directly to said injection means or via said aeration tank to said injection means, and a condenser communicating with said tank via said outlet means, said condenser liquifying the ammonia, $CO_2$ and water evaporated within said tank when said metal-rich ammoniacal liquor is supplied to said solution.

* * * * *